Oct. 7, 1924.  1,510,929
L. R. EMDE ET AL
WINDSHIELD
Filed Nov. 5, 1920   2 Sheets-Sheet 1

Inventors
Louis R. Emde & Arthur F. Bamford
By their Attorney
Henry J. Lucke

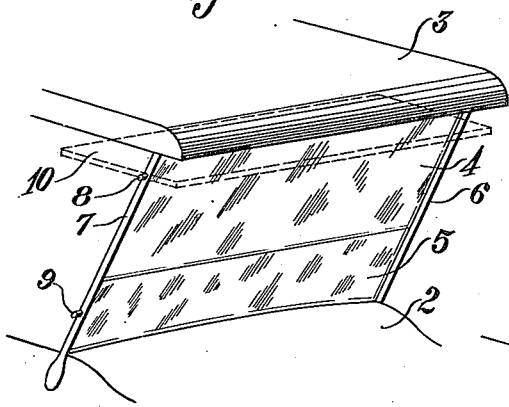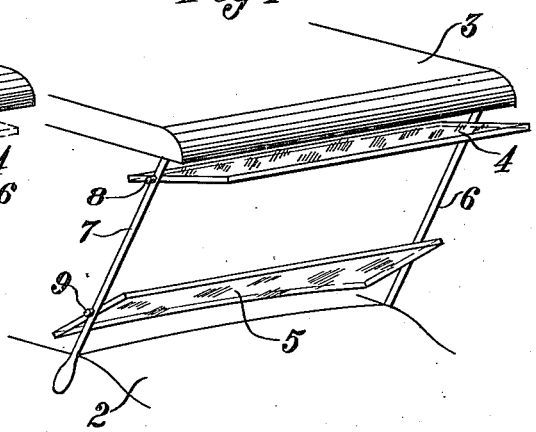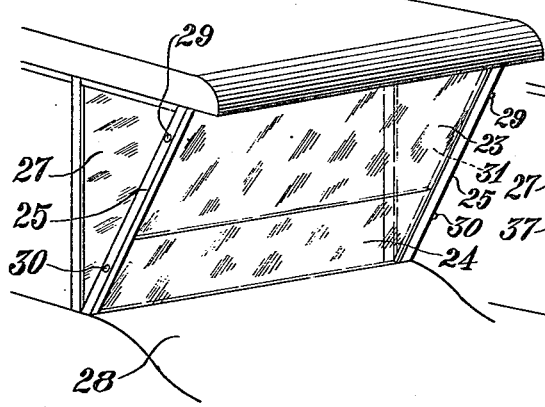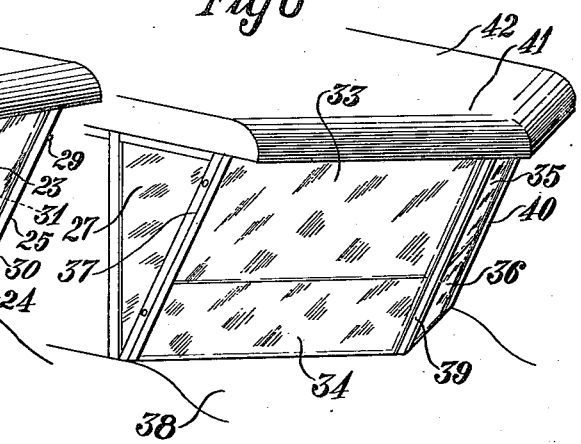

Patented Oct. 7, 1924.

1,510,929

UNITED STATES PATENT OFFICE.

LOUIS REGINALD EMDE, OF NEWARK, AND ARTHUR PRYCE BAMFORD, OF IRVINGTON, NEW JERSEY.

WINDSHIELD.

Application filed November 5, 1920. Serial No. 421,820.

*To all whom it may concern:*

Be it known that we, LOUIS REGINALD EMDE and ARTHUR PRYCE BAMFORD, citizens of the United States of America, residing at Newark, county of Essex, State of New Jersey, and Irvington, county of Essex, State of New Jersey, respectively, have invented certain new and useful Improvements in Windshields, of which the following is a specification.

This invention relates to wind shields.

An object of this invention is to provide a wind shield constructed and arranged for the purpose of obviating the deposit of rain or other atmospheric moisture thereon.

A further object of the invention is to attain a construction of wind shield whereby any rain or other atmospheric moisture is positively removed therefrom by the action of the air currents arising upon the travel of the vehicle.

Our invention is applicable for the various types of automobiles and for vehicles of similar character and in the more preferred forms of the invention, the wind shield as of usual construction and formed of a plurality of sections of transparent material, a frame in which such sections are adjustably mounted and constructed and arranged whereby when the wind shield is in closed or in any approximately closed position, the sections are inclined to the vertical and tilted backwardly relative to the forward direction of the car.

Further features and objects of the invention will be more fully understood from the following detail description and the accompanying drawings, in which—

Fig. 3 shows in perspective on an enlarged scale a two section wind shield and frame applicable for installation on any open type of automobile;

Fig. 4 is a perspective view similar to Fig. 3, but showing the wind-shield sections in open position;

Fig. 5 is a perspective view of a two section frontal wind-shield and single side section, applicable for use on a sedan or other closed type of automobile, and Fig. 6 is a perspective similar to Fig. 5 but showing a modification.

Figure 1:
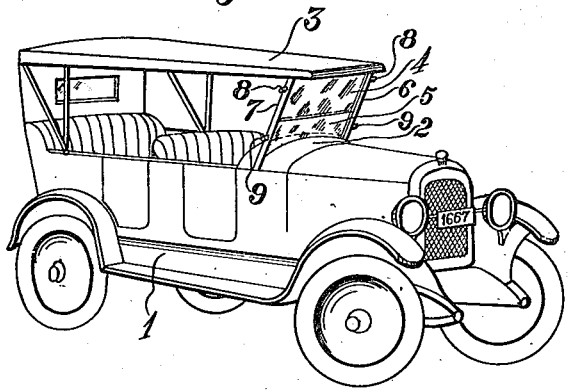
Fig. 1 is a perspective view of touring automobile provided with a wind shield embodying our invention.

Referring to Fig. 1, the automobile 1 is shown of the contour and type and is selected as representative of any type of open car and having any approved construction of its parts including the cowl 2, and appropriate parts for the mounting of the top 3.

Our improvement as shown in Fig. 1 is illustrated in reference to the usual wind-shield comprising two sections 4, 5, of glass or other transparent material and mounted in suitable standards, two being shown 6, 7, positioned at their lower ends at the opposite sides of the cowl 2. These standards 6, 7, slant forwardly upwardly in the forward direction of the car.

The upper section is suitably held on pivot mountings and held in any desired pivotal position by means of the oppositely disposed set nuts 8, 8.

The lower section 5 is similarly held in suitable pivotal mounting in the standards 6, 7, and held in any desired pivotal position by means of the oppositely disposed set nuts 9, 9.

The upper ends of the standards 6, 7, are provided with the usual fixtures for securing the forward portion of the top 3 thereto, as will be understood by the art.

The upper section 4 and lower section 5 of the wind shield as shown in Fig. 1 are in closed position, as is also indicated and on an enlarged scale in Fig. 3. The similar parts of the wind-shield shown in Fig. 3 and also in Fig. 4 are indicated by like reference numbers and accordingly specific reference to the parts of the parts shown in Figs. 3 and 4 is unnecessary.

As is indicated in dotted outline at 10, the upper wind-shield section 4 may be swung rearwardly to a position to clear the driver and additional passengers of the front seat. Or the upper wind-shield 4 may be swung forwardly as is indicated in full outline in Fig. 4.

It will be noted that the top 3 may be made of greater length, and is preferably made of greater length when combined with our wind-shield to extend more forwardly of the location of the eyes of the driver, than as heretofore proposed or used, and thereby the forward portion of the top serves as a sunshade.

In the closed position of the wind-shield, as indicated in full outline in Fig. 3, and also in Fig. 1, under the condition of rain, we have discovered that for rains varying in range from slight downpour to relatively heavy downpour, practically no drop of rain reaches any section of the windshield. For heavier downpours, and for mist, and in the event of incidental arrest of raindrops on the wind shield, the inclination backwardly of the windshield relative to the direction of forward travel of the car gives rise to the positive force of the air currents to push the rain drops downwardly of the windshield and eventually off of the wind-shield.

Such important advantage of the absence or removal of rain from our wind-shield, we believe from our discoveries to be due to the arrangement of inclination of the windshield relative to the direction of forward travel of the car.

Figure 2:
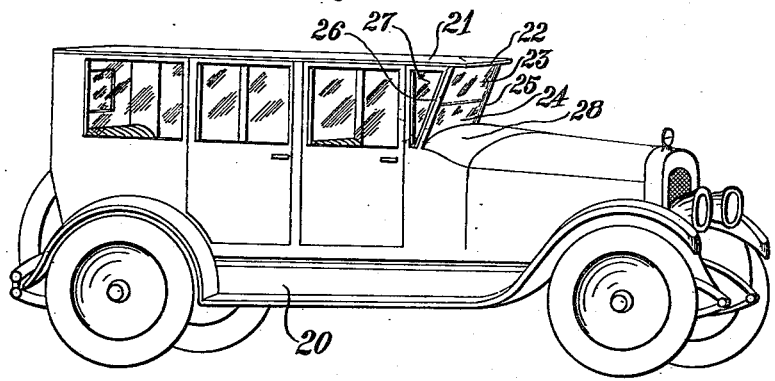
Fig. 2 is a perspective view of an improved sedan type of automobile provided with a wind shield embodying our invention.

In Fig. 2, we have shown our invention of a construction adapted for a sedan type of automobile 20, the parts not specifically referred to herein being of any approved form and construction.

The top 21 extends more forwardly than as heretofore proposed or used, the increased forward extension of the top being indicated at 22. In Fig. 2 the usual two section windshield is indicated, the upper section at 23, the lower section at 24, and suitably retained in pivotal mountings described more particularly hereinafter, in the oppositely disposed standards 25, 26.

Such form of our wind-shield comprises also the side sections, one at 27, appearing in Fig. 2 and the opposite section being of similar construction and arrangement.

The standards 25, 26 are mounted at their respective bottom ends at the side of the cowl 28 and are inclined forwardly of the travel of the car relative to the upward direction of extension of the standards 25, 26. The standards 25, 26 are secured at their upper ends to the forward portion 22 of the top, by any approved type of fixture, as will be understood.

As appears on a larger scale in Fig. 5, the upper wind-shield section 23 is mounted in any approved type of pivotal mounting and set in any desired pivotal position by means of the oppositely disposed set screws 29. Similarly, the lower section 24 is mounted in suitable pivotal mountings and set in any desired pivotal position by means of the oppositely disposed set screws 40.

The side wind-section 31 is indicated in dotted outline and corresponds to the oppositely disposed side section 27, shown in full outline in Fig. 5.

As appears, our wind-shield as constructed for sedan and other closed types of cars embodies the advantage of freedom of rain on the forward wind-shield sections during the condition of rain, and by reason of the rearward tilting of the forward wind-shield sections, as and for the reasons set forth above.

In relatively slight downpour, we have discovered that the upper wind-shield section, or sections, may be slightly open, i. e., turned forwardly slightly out of alignment with the plane of the standards 6, 7, and notwithstanding be free from any deposit of rain and thereby provide for an opening or ventilation by the pressure of air currents between the lower end of the upper wind-shield section and the lower wind-shield section. This advantage is particularly of importance in respect to the use of our invention on a sedan or other type of closed automobile.

In Fig. 6 we have shown a modified form of wind-shield for a sedan or other closed type of automobile, and having a plurality, specifically two, forward wind-shields arranged angularly and laterally to one another. The upper section of the right hand wind-shield is shown at 33 and its lower section at 34 and the upper section of the left hand wind-shield at 35 and its lower section at 36. In such construction three, or more, standards are employed, three standards being shown in Fig. 6, namely at 37 at the right of the cowl 38, and the standard 39 at the center of the cowl and the standard 40 at the left of the cowl, each standard being anchored at its bottom end and tilted in its upward direction forwardly relatively to the direction of forward travel of the car.

The forward extension 41 of the top 42 is of corresponding angular formation, as will be understood. The respective wind-shield sections are mounted in similar pivotal mountings and set in any desired adjusted position by means of set nuts corresponding similar to the above described construction.

In addition to the advantages of freedom of deposit of rain, our invention is useful on sedans and other closed types of automobiles by reason of the side sections of the windshield providing for a clear space of sight for the driver at the left and at the right forwardly of the car. This is an advantage over sedan constructions heretofore proposed and used, in that, for left-hand drive, the usual vertical standard is not present and the clear space of sight provided by our invention gives added security to travel.

It will be apparent that our invention is applicable to all types of windshield, whether comprising pivoted or other movable sections or parts, inasmuch as the improvement effected by our invention relates to the rearwardly, downwardly inclined disposition of the windshield when in closed or substantially closed position, and not in respect to the particular mounting of the windshield relative to the front standards or equivalent.

Whereas we have described our invention by reference to specific forms thereof, it will be understood that many changes and modifications may be made without departing from the spirit of the invention, as defined by the appended claims.

We claim.

1. In an automobile, the combination with the body of the vehicle, of a pair of upwardly flared standards directly secured at their lower ends to one side of said body, a pair of upwardly flared standards directly secured to the opposite side of said body, one standard of each of said pairs extending substantially vertically, the forward standard of each of said pairs extending upwardly forwardly in the direction of forward travel of the automobile, a sheet of transparent material serving as the wind shield proper and means for mounting said sheet of transparent material directly on said forwardly extending standards respectively to dispose said sheet of transparent material when in substantially closed position to extend upwardly and forwardly in the direction of forward travel of the vehicle.

2. The combination of a vehicle body including a cowl, a plurality of standards mounted respectively on opposite sides and directly to said cowl, certain of said standards extending upwardly and forwardly in the direction of forward travel of the vehicle, a section of transparent material, means for mounting said section of transparent material on said forwardly extending standards and a top for the vehicle extending to the upper ends of said certain forwardly extending standards.

3. In an automobile having a cowl, a pair of upwardly flared standards secured at their lower ends to one side of said cowl, a pair of upwardly flared standards secured to the opposite end of said cowl, one standard of each of said pairs extending substantially vertically, the forward standard of each of said pairs extending forwardly in the direction of forward travel of the automobile, a top for the automobile extending forwardly to the upper ends of said forward standards respectively, a section of transparent material and means for mounting said section directly on said forwardly extending standards respectively.

4. In an automobile having a cowl, a pair of upwardly flared standards secured at their lower ends to one side of said cowl, a pair of upwardly flared standards secured to the opposite end of said cowl, one standard of each of said pairs extending substantially vertically, the forward standard of each of said pairs extending forwardly in the direction of forward travel of the automobile, a top for the automobile extending forwardly to the upper ends of said forward standards respectively, a section of transparent material, means for mounting said section at its opposite ends directly on said forwardly extending standards respectively and transparent material mounted between the vertically extending and the forwardly extending standards of each of said pairs.

5. The combination of a vehicle body including a cowl, a plurality of standards respectively mounted on opposite sides and directly to said cowl, certain of said standards extending upwardly and forwardly in the direction of forward travel of the vehicle, a section of transparent material, means for mounting said section directly on said forwardly extending standards to dispose said section of transparent material when in closed position to extend upwardly and forwardly in the forward direction of the travel of the vehicle, and laterally disposed sections of transparent material mounted respectively between the standards on the opposite sides of the vehicle.

6. A windshield for vehicles comprising in combination with the cowl of the vehicle, a pair of front standards mounted respectively on the opposite lateral sides of the cowl and extending upwardly and forwardly from the cowl in the direction of forward travel of the vehicle, a sheet of transparent material serving as the windshield proper, means for mounting said sheet on said pair of front standards to dispose said sheet of transparent material when in substantially closed position at all times to extend upwardly and forwardly in the direction of forward travel of the vehicle and a top for the vehicle extending forwardly of and secured fixedly to the upper ends of the said front standards.

7. A windshield for vehicles comprising in combination with the cowl of the vehicle, a pair of front standards mounted respectively on the opposite lateral sides of the cowl and extending upwardly and forwardly from the cowl in the direction of forward travel of the vehicle, a sheet of transparent material serving as the windshield proper, means for mounting said sheet on said pair of front standards to dispose said sheet of transparent material when in substantially closed position at all times to extend upwardly and forwardly in the direction of forward travel of the vehicle and a top for the vehicle extending unitarily over the body of the vehicle and forwardly of the upper ends of the said front standards.

8. A windshield for vehicles comprising in combination with the cowl of the vehicle, a pair of front standards mounted respectively on the opposite lateral sides of the cowl and extending upwardly and forwardly from the cowl in the direction of forward travel of the vehicle, a sheet of transparent material serving as the windshield proper, means for mounting said sheet on said pair of front standards to dispose said sheet of transparent material when in substantially closed position at all times to extend upwardly and forwardly in the direction of forward travel of the vehicle and a sheet of transparent material on each side of the cowl disposed adjacent said front standards respectively and extending laterally of the cowl and a top for the vehicle extending forwardly of and secured fixedly to the upper ends of the said front standards.

In testimony whereof we have signed this specification this 29th day of October 1920.

LOUIS REGINALD EMDE.
ARTHUR PRYCE BAMFORD.